US008886718B2

(12) United States Patent
D'Angelo et al.

(10) Patent No.: US 8,886,718 B2
(45) Date of Patent: Nov. 11, 2014

(54) PROVIDING PERSONALIZED PLATFORM APPLICATION CONTENT (71) Applicant: Facebook, Inc., Menlo Park, CA (US)

(72) Inventors: Adam D'Angelo, Mountain View, CA (US); Charles Duplain Cheever, Palo Alto, CA (US); Arieh Steinberg, Seattle, WA (US); James H. Wang, San Francisco, CA (US); Mark Slee, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/141,007

(22) Filed: Dec. 26, 2013

(65) Prior Publication Data

US 2014/0108518 A1    Apr. 17, 2014

Related U.S. Application Data (63) Continuation of application No. 12/138,212, filed on Jun. 12, 2008, now Pat. No. 8,694,577.

(60) Provisional application No. 60/934,365, filed on Jun. 12, 2007.

(51) Int. Cl.
| G06F 15/16 | (2006.01) |
| G06Q 10/00 | (2012.01) |
| H04L 9/32 | (2006.01) |
| G06F 17/00 | (2006.01) |
| G06Q 30/02 | (2012.01) |
| G06Q 10/10 | (2012.01) |
| H04L 29/08 | (2006.01) |
| H04L 29/06 | (2006.01) |

(52) U.S. Cl.
CPC .......... *H04L 67/1097* (2013.01); *G06Q 30/02* (2013.01); *G06Q 10/10* (2013.01); *H04L 67/306* (2013.01); *H04L 63/08* (2013.01); *H04L 67/146* (2013.01); *H04L 63/0884* (2013.01); *H04L 63/102* (2013.01); *H04L 67/14* (2013.01); *H04L 67/20* (2013.01)
USPC ............ 709/203; 705/1.1; 713/168; 707/600; 726/26

(58) Field of Classification Search
None
See application file for complete search history.

(56) References Cited

U.S. PATENT DOCUMENTS

| 5,796,967 A | 8/1998 | Filepp et al. |
| 5,937,413 A | 8/1999 | Hyun et al. |

(Continued)

OTHER PUBLICATIONS

European Patent Office, Examination Report, European Patent Application No. 08770901.0, Jun. 13, 2014, five pages.

*Primary Examiner* — Brian P Whipple
*Assistant Examiner* — Michael A Chambers
(74) *Attorney, Agent, or Firm* — Fenwick & West LLP (57) ABSTRACT A social networking website maintains a profile for each user of the website. The profile includes data associated with a user, such as a connection to one or more plurality of other users of the social networking website or user preferences. The social networking website communicates with one or more third-party application servers to provide one or more applications to social networking website users. When a social networking website user requests an application provided by a third-party application server, the social networking website communicates a subset of the user's profile to the third-party application server, allowing the third-party application server to use this profile data to personalize the application performed for the user. A privacy setting associated with a user profile allows the social networking website to limit the profile data communicated to the third-party application server.

24 Claims, 5 Drawing Sheets (56) References Cited

U.S. PATENT DOCUMENTS

| | | |
|---|---|---|
| 5,987,440 A | 11/1999 | O'Neil et al. |
| 6,029,141 A | 2/2000 | Bezos et al. |
| 6,959,420 B1 * | 10/2005 | Mitchell et al. ............... 715/745 |
| 7,013,292 B1 | 3/2006 | Hsu |
| 7,076,458 B2 | 7/2006 | Lawlor et al. |
| 7,076,504 B1 | 7/2006 | Handel et al. |
| 7,249,123 B2 | 7/2007 | Elder et al. |
| 7,269,590 B2 | 9/2007 | Hull et al. |
| 7,272,603 B2 | 9/2007 | Fujita et al. |
| 7,369,862 B2 | 5/2008 | Kim et al. |
| 7,610,287 B1 | 10/2009 | Dean et al. |
| 7,614,002 B2 * | 11/2009 | Goldfeder et al. ............ 715/745 |
| 7,685,236 B1 | 3/2010 | Harik et al. |
| 7,716,140 B1 * | 5/2010 | Nielsen et al. ................ 705/319 |
| 7,764,699 B2 * | 7/2010 | Jennings et al. .............. 370/401 |
| 7,802,290 B1 * | 9/2010 | Bansal et al. ..................... 726/3 |
| 7,822,620 B2 * | 10/2010 | Dixon et al. ................... 705/1.1 |
| 7,832,003 B2 * | 11/2010 | Kelly et al. ...................... 726/18 |
| 8,225,376 B2 * | 7/2012 | Zuckerberg et al. .............. 726/4 |
| 2001/0037721 A1 | 11/2001 | Hasegawa et al. |
| 2002/0059201 A1 | 5/2002 | Work |
| 2003/0145093 A1 | 7/2003 | Oren et al. |
| 2003/0222918 A1 | 12/2003 | Coulthard |
| 2003/0225632 A1 | 12/2003 | Tong et al. |
| 2003/0233542 A1 | 12/2003 | Benaloh |
| 2004/0019807 A1 | 1/2004 | Freund |
| 2004/0024846 A1 | 2/2004 | Randall et al. |
| 2004/0078591 A1 | 4/2004 | Teixeira et al. |
| 2004/0088177 A1 | 5/2004 | Travis et al. |
| 2004/0148275 A1 | 7/2004 | Achlioptas |
| 2004/0172455 A1 | 9/2004 | Green et al. |
| 2004/0255137 A1 * | 12/2004 | Ying .............................. 713/193 |
| 2005/0021750 A1 | 1/2005 | Abrams |
| 2005/0060417 A1 | 3/2005 | Rose |
| 2005/0076233 A1 * | 4/2005 | Aarts et al. .................... 713/201 |
| 2005/0096048 A1 | 5/2005 | Clare et al. |
| 2005/0114759 A1 | 5/2005 | Williams et al. |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171955 A1 | 8/2005 | Hull et al. |
| 2005/0177385 A1 | 8/2005 | Hull et al. |
| 2005/0197846 A1 | 9/2005 | Pezaris et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203807 A1 | 9/2005 | Bezos et al. |
| 2005/0210395 A1 | 9/2005 | Wakita et al. |
| 2005/0216300 A1 * | 9/2005 | Appelman et al. ................ 705/1 |
| 2005/0216550 A1 | 9/2005 | Paseman et al. |
| 2005/0234781 A1 | 10/2005 | Morgenstern et al. |
| 2005/0235062 A1 | 10/2005 | Lunt et al. |
| 2005/0256756 A1 | 11/2005 | Lam et al. |
| 2005/0257250 A1 * | 11/2005 | Mitchell et al. .................... 726/3 |
| 2006/0004789 A1 * | 1/2006 | Lunt et al. ...................... 707/100 |
| 2006/0021009 A1 | 1/2006 | Lunt |
| 2006/0041543 A1 | 2/2006 | Achlioptas |
| 2006/0042483 A1 | 3/2006 | Work et al. |
| 2006/0048059 A1 | 3/2006 | Etkin |
| 2006/0052091 A1 | 3/2006 | Onyon et al. |
| 2006/0068767 A1 | 3/2006 | Bhakta et al. |
| 2006/0074863 A1 | 4/2006 | Kishore et al. |
| 2006/0075122 A1 * | 4/2006 | Lindskog et al. ............. 709/228 |
| 2006/0080613 A1 | 4/2006 | Savant |
| 2006/0085419 A1 | 4/2006 | Rosen |
| 2006/0136419 A1 | 6/2006 | Brydon et al. |
| 2006/0143068 A1 | 6/2006 | Calabria |
| 2006/0143183 A1 | 6/2006 | Goldberg et al. |
| 2006/0149740 A1 | 7/2006 | Tsutazawa et al. |
| 2006/0161599 A1 | 7/2006 | Rosen |
| 2006/0184617 A1 | 8/2006 | Nicholas et al. |
| 2006/0190281 A1 | 8/2006 | Kott et al. |
| 2006/0194186 A1 | 8/2006 | Nanda |
| 2006/0215690 A1 | 9/2006 | Wilson et al. |
| 2006/0218225 A1 * | 9/2006 | Hee Voon et al. ............. 709/201 |
| 2006/0229063 A1 | 10/2006 | Koch |
| 2006/0230061 A1 | 10/2006 | Sample et al. |
| 2006/0247940 A1 | 11/2006 | Zhu et al. |
| 2006/0248573 A1 | 11/2006 | Pannu |
| 2006/0248584 A1 * | 11/2006 | Kelly et al. ...................... 726/18 |
| 2006/0256008 A1 | 11/2006 | Rosenberg |
| 2006/0265227 A1 | 11/2006 | Sadamura et al. |
| 2006/0288401 A1 | 12/2006 | Wilson |
| 2006/0293976 A1 | 12/2006 | Nam |
| 2007/0021111 A1 | 1/2007 | Celik |
| 2007/0174389 A1 | 7/2007 | Armstrong et al. |
| 2007/0191058 A1 * | 8/2007 | Vanska et al. ................. 455/558 |
| 2007/0208916 A1 | 9/2007 | Tomita |
| 2007/0266118 A1 | 11/2007 | Wilkins |
| 2007/0282959 A1 | 12/2007 | Stern |
| 2007/0282982 A1 | 12/2007 | Fischer et al. |
| 2008/0005076 A1 | 1/2008 | Payne et al. |
| 2008/0010343 A1 | 1/2008 | Escaffi et al. |
| 2008/0033776 A1 | 2/2008 | Marchese |
| 2008/0040428 A1 | 2/2008 | Wei et al. |
| 2008/0046976 A1 * | 2/2008 | Zuckerberg ........................ 726/4 |
| 2008/0070697 A1 | 3/2008 | Robinson et al. |
| 2008/0086458 A1 | 4/2008 | Robinson et al. |
| 2008/0134294 A1 * | 6/2008 | Mattox et al. ...................... 726/4 |
| 2008/0137859 A1 | 6/2008 | Jagadeesan et al. |
| 2008/0209482 A1 | 8/2008 | Meek et al. |
| 2008/0309550 A1 * | 12/2008 | Sairo et al. ................... 342/357.1 |
| 2009/0076912 A1 | 3/2009 | Rajan et al. |
| 2009/0221307 A1 | 9/2009 | Wolak et al. |
| 2010/0030734 A1 * | 2/2010 | Chunilal ............................ 707/3 |
| 2010/0094878 A1 * | 4/2010 | Soroca et al. .................. 707/748 |

* cited by examiner

PROVIDING PERSONALIZED PLATFORM APPLICATION CONTENT

CROSS REFERENCE TO RELATED APPLICATIONS

This application is a continuation of U.S. patent application Ser. No. 12/138,212, filed Jun. 12, 2008 (now allowed) which claims the benefit of U.S. Provisional Application No. 60/934,365, filed Jun. 12, 2007, which are incorporated herein by reference in their entirety.

BACKGROUND

1. Field of Art

The invention generally relates to social networking and more specifically to personalizing a third-party application based on user-specific data from a social network.

2. Description of the Related Art

Social networks, or communities of entities that share interests or activities or are interested in exploring the interests of other entities, have become more prevalent. Particularly, social networking websites have allowed users or entities to more efficiently communicate information among each other. For example, a user may post contact information, background information, job information, hobbies or other user-specific data to a social networking website. Other users or entities can then review the posted data by browsing user profiles or searching for profiles including specific data.

Some social networking websites incorporate a system for connecting users to content most relevant to each user. For example, users are grouped according to one or more common attributes in their profiles, such as geographic location, employer, job type, music preferences or other attributes. Additionally, some social networks allow a user to access one or more third-party applications from the social network. These third-party applications are run within the social networking websites. Such applications can extend the functionality of the social networking website, providing users with new and interesting ways to communicate, collaborate, and interact with each other. For example, a social network website includes a "widget," which allows a user to access data or services provided by a third-party. Hence, the "widget," or a similar user interface, allows a social networking website user to interact with a third-party application separate from the social networking website.

Although the social networking website allows a user to receive content from the social network that is personalized based on user data, information provided by a third-party application is not personalized unless the user separately provides information to the third-party application. Hence, the user must provide separate sets of data to the social networking website and the third-party application to receive personalized content from both sources. The third-party application cannot access user data stored by the social networking website associated with the user.

SUMMARY

To provide personalized interaction with a third-party application, a social networking website shares stored information about its users with a third-party application server. A third party application, configured to execute within the social networking website, can access the stored information about a user, and construct content pages based on the information specific to the user. As a result, the user of social networking website is able to receive personalized content or information from the third-party application. The stored information for the user includes information about the user—such as the user's interests, preferences, demographics, and so forth—as well as information identifying the user's friends. From the information identifying the user's friends, additional content associated with such friends can be accessed and also used to construct content pages for the initial user. For example, a third-party application may provide a listing of the social networking website user's favorite songs and user data from the social networking website to also provide favorite songs of one or more additional social networking website users associated with the social networking website user.

In an embodiment, a user communicates a request to access a third-party application to the social networking website. The social networking website identifies a third-party application server associated with the request and verifies that the user is associated with a user profile maintained by the social networking website. For example, the social networking website requests user identification, such as a username and password, from the user to identify the user profiler associated with the user. The social networking website transmits the request and a user identifier to the third-party application server. Additionally, the social networking website also transmits a subset of data from the user profile associated with the user, such as the user's friends, the user's most recently added friends, the user's picture or other user data, to the third-party application server. To maintain the privacy of social networking website users, the social networking website first examines a privacy setting associated with each user profile and does not transmit to the third-party application server any data that a user has configured to be inaccessible to the to the viewing user or to third-party applications. The third-party application server then generates application content based on the request, the user identifier and any additional data provided by the social networking website. The third-party application can also directly request data that was based on the user identifier from the social networking website. In either case, the application content is personalized as it is based on the user identifier and additional data. In one embodiment, the personalized application content is specific to user directly, such as based on the user's preferences, interests, demographics, other users associated with the user, recent activities or affiliation with one or more other users. In a further embodiment, the application content is personalized to the user, as it is based on information about the user's friends, for example the interests, demographics, and other data associated with the user's friends. Thus, the third-party application is able to offer content that is directly of interest to the user—being based on the information the social networking website maintains about the user and/or the user's friends—and is not limited to generic content.

Alternatively, the user may initially transmit a request to access an application to the third-party application server. The third party application server then communicates this request to the social networking website which determines whether the user has a user profile stored on the social networking website, such as by requesting that the user login to the social networking website. The social networking website then examines a privacy setting associated with the user profile to determine what data, if any, is accessible by the third-party application server. The social network website then communicates data to the third-party application server responsive to the privacy setting. An application output is then generated using the provided data and displayed to the user by the third-party application server.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION

Figure 1:
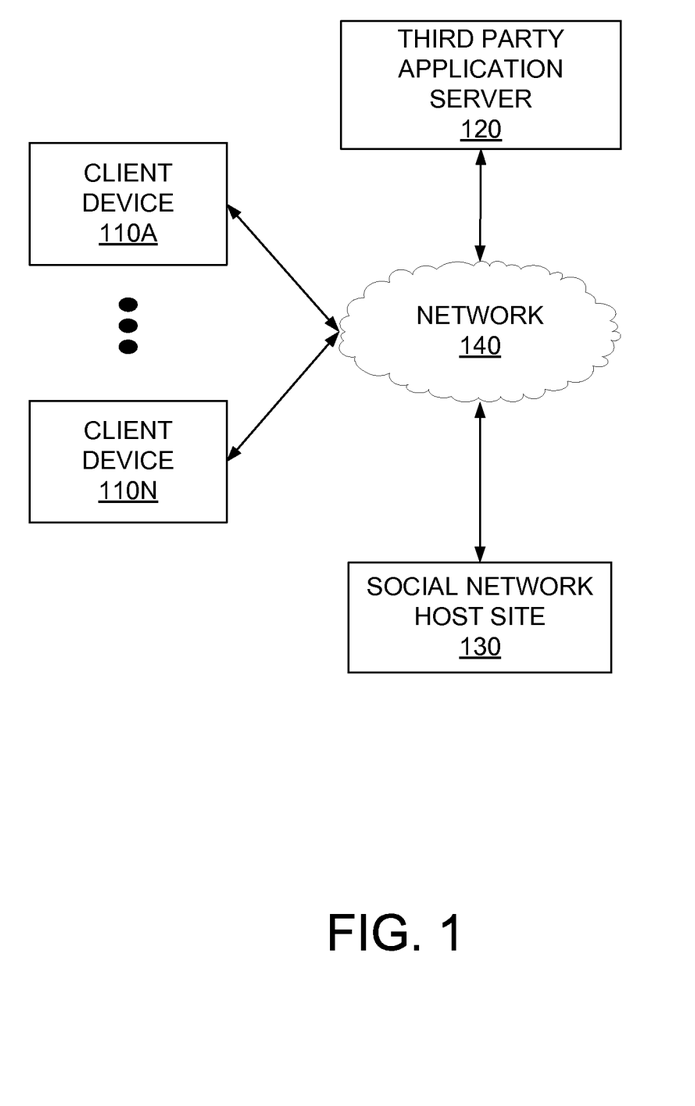
FIG. 1 is a high level block diagram illustrating a system for sharing user data between a social networking website and a third-party application server.

FIG. 1 is a high level block diagram illustrating the system environment for sharing user data between a social networking website 130 and a third-party application server. The system environment comprises one or more client devices 110, a third-party application server 120, a social networking host site 130 and a network 140. In alternative configurations, different and/or additional modules can be included in the system environment.

The client devices 110a . . . n comprise one or more computing devices which transmit and/or receive data via network 140 and receive user input. For example, client devices 110 can be desktop computers, laptop computers, smartphones, personal digital assistants (PDAs), mobile computing devices or any other device including computing functionality and data communication capabilities.

A third-party application server 120 comprises a source, such as a computing device or a virtual machine that is associated with one or more identifiers, such as a single DNS entry (e.g., www.domainA.com) or related DNS entries (e.g., all registrations with the base name www.domainA.com). The third-party application server 120 communicates or shares data, information or services with client devices 110, the social networking website 130 via the network 140 responsive to requests by a client device 110 or by the social networking website 130. For example, the third-party application server 120 receives data from a client device 110 via network 120, processes the received data and transmits output data back to the client device 110 via network 140. The third-party application server 120 provides applications which are configured to execute within the social networking website's runtime environment. Examples of applications provided by the third-party application server 120 include applications for online sales, online auctions, gift giving, meetings, event management, discussion boards or other application that provides data or other information to a client device 110 through the network 130.

Applications provided by the third-party application server 120 provide enhanced content and interactivity within the social network host site 130, which also maintains an application object for each application hosted in the social networking website. An example application is an enhanced messaging service, in which members can send virtual objects (such as a "gift" or "flowers") and an optional message to another member. The use of any functionality offered by the application may thus constitute an action by a social network host site 130 user in connection with the application. In addition, continuing the example from above, the receipt of the virtual gift or message may also be considered an action in connection with the application. It can therefore be appreciated that actions may be passive and need not require active participation by a member. The scope and type of applications provided is limited only by the imagination and creativity of the application developers. Applications are generally written as server-side code that is run on the third-party application server 120; although an application may also use client-side code as appropriate.

The social network host site 130 comprises a computing system which allows one or more users to interact with each other using network 140. For example, the social network host site 130 stores data, such as user profiles or user preferences, describing users of the social network host site 103, also called "members of a social network," or "members," and also stores data describing one or more relationships between different users. Each user in the social network host site 130 is related to one more or more other users through some social relationship, such as relative, friends, co-workers, members of a common organization, alumni of a common educational facility, and so forth. For ease of description, other users who related to a given user in any of the foregoing or other ways, are called the given user's "friends."

Hence, the social network host site 130 offers its members the ability to communicate and interact with other members of the website. In use, members join the social networking host site 130 and then add connections to a number of other members to whom they desire to be connected. As used herein, the term "friend" refers to any other member to whom a member has formed a connection, association, or relationship via the website. Connections may be added explicitly by a member, for example, the member selecting a particular other member to be a friend, or automatically created by the social network host site 130 based on common characteristics of the members (e.g., members who are alumni of the same educational institution). Connections in social networking websites are usually in both directions, but need not be, so the terms "member" and "friend" depend on the frame of reference. For example, if Bob and Joe are both members and connected to each other in the website, Bob and Joe, both members, are also each other's friends. The connection between members may be a direct connection; however, some embodiments of a social network host site 130 allow the connection to be indirect via one or more levels of connections. Also, the term friend need not require that members actually be friends in real life, (which would generally be the case when one of the members is a business or other entity); it simply implies a connection in the social networking website.

The social network host site 130 provides various mechanisms allowing members to communicate with each other or to obtain information that they find interesting such as activities that their friends are involved with, applications that their friends are installing, comments made by friends on activities of other friends etc. Examples of the mechanisms allowing members to communicate with each other include:

- An Email Channel allowing embers to communicate by emails.
- A Notification Channel communicating a message informing a member that some activity involving the member has occurred on the social network.
- An Invitation Channel communicating one or more invitations between users. An invitation is a message sent by a member inviting another member to do something e.g., a member can invite his friend to install an application.
- A Wall Post Channel allowing members to share information between friends: A wall is an application allowing members to write interesting information to be shared between friends. A message written to a member's wall is called a wall post. A member can post on his own wall, as well as walls of all his friends. Any friend of a member can see what is written on his wall.
- A Newsfeed Channel updating a member of activities done by friends of the member: The newsfeed is constantly updated as the member's friends perform various activities, such as adding applications, commenting on photos, making new friends etc.
- A Mini-feed Channel providing a mini-feed listing actions taken by the member: For example, the member may have added new friends to his social network or installed certain applications. All such activities of a member are listed in the mini-feed of that member.

In addition to interactions with other members, the social network host site 130 provides members with the ability to take actions on various types of items supported by the website. These items may include groups or networks (where "networks" here refer not to physical communication networks, but rather social networks of people) to which members of the website may belong, events or calendar entries in which a member might be interested, computer-based applications that a member may use via the website, and transactions that allow members to buy or sell items via the website. These are just a few examples of the items upon which a member may act on a social network host site 130, and many others are possible.

The social network host site 130 also maintains a number of objects for the different kinds of items with which a member may interact on the social network host site 130. In one example embodiment, these objects include user profiles, group objects, event objects, application objects (respectively, hereinafter, "groups," "events" and "applications"). In one embodiment, an object is stored by the social network host site 130 for each instance of its associated item. For example, a user profile is stored for each member who joins the social network host site 130, a group is stored for each group defined in the social network host site 130, and so on.

A member of the social network host site 130 may take specific actions on the social network host site 130, where each action is associated with one or more objects. The types of actions that a member may perform in connection with an object are defined for each object and largely depend on the type of item represented by the object. A particular action may be associated with multiple objects. Described below are a number of examples of particular types of objects that may be defined for the social network host site 130, as well as a number of actions that can be taken for each object. These objects and the actions discussed herein are provided for illustration purposes only, and it can be appreciated that an unlimited number of variations and features can be provided on a social networking host site 130.

The social network host site 130 maintains a user profile for each member of the social network host site 130. Any action that a particular member takes with respect to another member is associated with each user's profile, through information maintained in a database or other data repository. Such actions may include, for example, adding a connection to the other member, sending a message to the other member, reading a message from the other member, viewing content associated with the other member, attending an event posted by another member, among others. In addition, a number of actions described below in connection with other objects are directed at particular members, so these actions are associated with those members as well. The user profiles also describe characteristics, such as work experience, educational history, hobbies or preferences, location or similar data, of various users and includes data describing one or more relationships between users, such as data indicating users having similar or common work experience, hobbies or educational history. Additionally, the social network host site 130 includes user-defined relationships between different users, allowing users to customize their relationships with other users. For example, this user-specific customization allows users of the social network host site 130 to generate relationships with other users that parallel the user's real-life relationships, such as other users with the same educational history or other users in the same location.

A group may be defined for a group or network of members. For example, a member may define a group to be a fan club for a particular band. The social network host site 130 would maintain a group for that fan club, which might include information about the band, media content (e.g., songs or music videos) by the band, and discussion boards on which members of the group can comment about the band. Accordingly, member actions that are possible with respect to a group might include joining the group, viewing the content, listening to songs, watching videos, and posting a message on the discussion board.

Similarly, an event may be defined for a particular event, such as a birthday party. A member may create the event by defining information about the event such as the time and place and a list of invitees. Other members may accept the invitation, comment about the event, post their own content (e.g., pictures from the event), and perform any other actions enabled by the social network host site 130 for the event. Accordingly, the creator of the event as well as the invitees for the event may perform various actions that are associated with that event.

The social network host site 130 also enables members to add applications to their profiles. These applications provide enhanced content and interactivity within the social networking host site 130, which maintains an application object for each application hosted in the system environment. The applications may be provided by the website operator and/or by third party developers via third-party application server 120. An example application is an enhanced messaging service, in which members can send virtual objects (such as a "gift" or "flowers") and an optional message to another member. The use of any functionality offered by the application may thus constitute an action by the member in connection with the application. In addition, continuing the example from above, the receipt of the virtual gift or message may also be considered an action in connection with the application. It can therefore be appreciated that actions may be passive and need not require active participation by a member. The scope and type of applications provided is limited only by the imagination and creativity of the application developers. Generally, when a user logs into the site, the system environment determines which applications the user has installed (e.g., registered for) and then loads and runs such applications in combination with the underlying functionality of the social network host site 130.

Additionally, the social network host site 130 allows different users to communicate with one or more additional members using the network 140. For example, the social network host site 130 allows a user associated with client device 110A to communicate with a second user associated with client device 110B using network 140. The social network host site 130 is described below in further detail in conjunction with FIG. 2.

The network 140 may comprise any combination of local area and/or wide area networks, using both wired and wireless communication systems. Alternatively, the network 140 is replaced by a peer-to-peer configuration where the client devices 110, third-party application server 120 and social network host site 130 directly communicate with each other.

Figure 2:
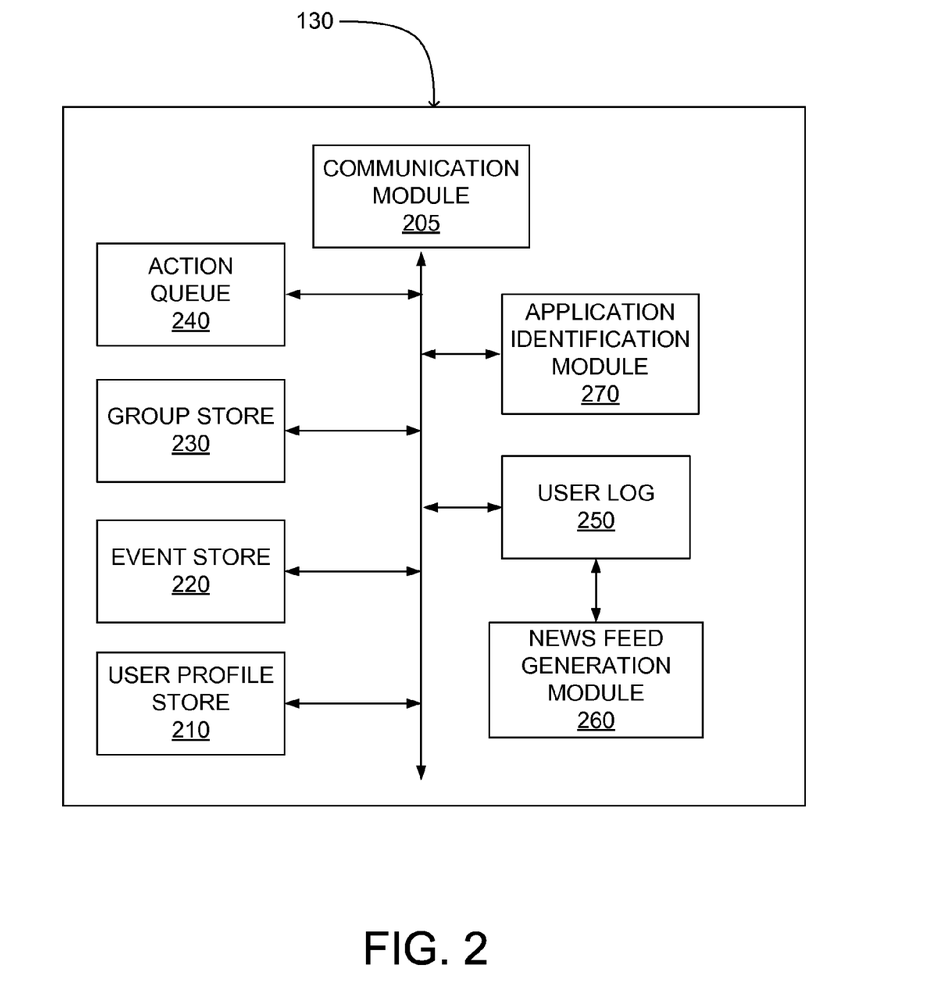
FIG. 2 is a block diagram illustrating an architecture of a social networking website for sharing user data with a third-party application server.

Referring to FIG. 2 a block diagram of an example social network host site 130 is shown. The social network host website 130 includes a communication module 205, a user profile store 210, an event store 220, a group store 230, an action log 240, a user log 250, a news-feed generation module 260 and an application identification module 270. In other embodiments, the social network host website 130 includes different and/or additional modules.

The communication module 205 links the social network host website 130 to the network 140, or to one or more client devices 110 and/or third-party application servers 120. The communication module 205 is a network interface which supports a networking protocol stack, such as the Open Systems Interconnection Basic Reference Model (OSI Model). Hence, the communication module 205 allows the social network host website 130 to communicate with the network 140 using wireless and/or wired communication methods.

The user profile store 210 includes data associated with different social network host site 130 users. When a user requests access to a service provided by the social network host website 130, a user profile is generated for that user and stored in the user profile store 210. The user profile includes data describing one or more characteristics associated with the user, such as demographic information, geographic location, educational history, employment status, employment history, user interests, user hobbies and/or additional descriptive data. A user profile also includes privacy settings indicating how accessible is to other users is any of the information in the user profile, user contact information or user-defined relationships with other users, such as the user's friends, networks, groups, or the like. The user profile store 210 can organize the stored user profiles by a social networking identifier, which is used to uniquely identify social network host website 130 users.

The event store 220 includes data describing various events that occur outside of the social network host website 130. For example, the event store 220 includes data describing a concert, movie, meeting or other physical event that occurs in the real-world, events occurring within the social network host site, or in any other online site. The event store 220 includes data describing the name of the event, an event start and end time, an event location (e.g., a city, or a website), a list of users attending the event or other descriptive data. Additionally, the event store 220 can include data or information summarizing the event after it ends, such as photos, videos, reviews or a discussion board associated with the event. The event store 220 can communicate with the user profile store 210, allowing users to be associated with events. The event store 220 can organize the stored event data according to an event identifier which uniquely identifies each stored event.

The group store 230 includes data describing various groups of users or relationships between users of the social network host site 130. For example, the group store 220 includes data describing a group name and a list of social network identifiers associated with the group. Additionally, the group store 230 can include data or information describing the group or one or more members of the group, such as photographs, video data, audio data or text data posted or otherwise attributed to a group member. The group store 230 can communicate with the user profile store 210, event store 220 and/or the action log 240 allowing events, actions and/or users to be associated with a group. The group store 230 can organize the stored event data according to a group identifier which uniquely identifies each stored group. The various stores are managed by a database management system, preferably using a redundant, distributed architecture. Portions of the stores can be maintained on disc or in memory as desired to improve performance and scalability.

The action log 240 includes data describing various actions taken by users within the social network host site 130. The stored actions can occur within the social network host site 130 as well on other sites, via an application programming interface exposed by the social network host site 130. In one embodiment, the social network host site 130 maintains the action log as a database of entries. When an action is taken on the social network host site 130, an entry for that action is added to the action log. Examples of user actions within the social network include sending a message to a friend, using a third-party application, joining a group, leaving a group, adding a relationship to another user, removing a relationship to another user, modifying a stored user profile, generating an event description or other modification or retrieval of data stored by the social network host site 130. Examples of user actions outside of the social network host site 130 include purchasing or reviewing a product or service using an online marketplace hosted by a third-party application server 120, registering with or subscribing to a website hosted by a third-party application server 120, purchase, requesting information from a website hosted by a third-party application server 120 or similar actions performed on a third-party application server 120. The action log includes data describing the user performing the action, the time the action occurred, an identifier for the user who performed the action, an identifier for the member to whom the action was directed, an identifier for the type of action performed, an identifier for an object acted on by the action (e.g., an application), content associated with the action, where the action occurred and/or other data describing the action. It can be appreciated that many types of actions that are possible in the social network host site 130 need not require all of this information. For example, if a member changes a picture associated with the member's profile, the action may be logged with just the member's identifier, an action type defining a picture change, and the picture or a link thereto as the content. The action log 240 can communicate with the user profile store 210, event store 220 and/or the group store 230 allowing events, users and/or groups to be associated with an action. The action log 240 can organize the stored action data according to an action identifier which uniquely identifies each stored action. The action log 240 can store actions based on when the action occurred. For example, the action log 240 may use a last-in, first-out (LIFO) log structure to store actions so that the most recent actions are retrieved from the action log 240 first. In one embodiment, a single action log 230 stores actions from all of the social network host site 130 users and organizes the stored actions according to user identifiers or partitions the action log to allocate storage for different users. Alternatively, the social network host site 130 includes multiple action logs 240 associated with different subsets of the user population, such as by affiliation, group, geography, or the like.

For each user, a user log 250 is maintained, based on actions extracted from the action log 250. A given user's log 250 includes data from the action log 240 describing user actions, and can include additional data from the user profile store 210, event store 220 and or group store 230 that is associated with or affected by the action, to further annotate or tag the action data. The user log 250 can organize the action and related data chronologically, allowing the user log 250 to record the sequence in which actions were performed by the user and allowing easier access to more recent user actions.

The news-feed generator 260 is adapted to communicate with the user log 250 and generates, for each user, a news-feed comprising one or more stories, based on the content of the user log 250 associated with a particular user. A story is a message that summarizes, condenses, or abstracts one or more of actions of the user from that user's log 250. The generated news-feed stories can then be transmitted to one or more related users—e.g., the user's friends—allowing the user's actions to be shared with such related users. The news-feed generator 260 applies an affinity algorithm to the contents of the user log 250 accounting for a user's relationships with other users or groups as specified in the user profile store 210 and/or group store 230 to select the actions in the log 250 that are to be the basis of one or more stories for distribution to the related users. By accounting for the user relationships with other users and/or groups, the news-feed generator 260 determines data from the user log 250 most relevant to other related users.

In one embodiment, the news-feed generator 260 examines the contents of the user log 250 of a given user for all actions occurring over a selected past interval, such as a day or a week. The news-feed generator 260 then generates a message (a "story") based upon to one more actions in the user log 250. For example, the news-feed generator 260 generates a message identifying the given user (e.g., User A), the type of action and, optionally, a user, group or other entity affected by the action (e.g., "User A joined Group 1"). For various messages, the news-feed generator 260 determines the interest of various related users to different messages associated with the given user. For example, the news-feed generator 260 determines how recently a related user accessed data from or associated with the given user, how often a related user has accessed data from or associated with the given user, the amount of common or similar data in the profiles of the given user and the related user and/or other factors representative of user interest in a particular message. Based on the determined level of related user interest, a message is communicated to those related users with the highest interest in the information message. This process can also be applied to the user logs of the related users for a given user. For example, for a given user A, the user logs of related users B, C, D, E can be processed for a selected interval, and one or more messages constructed for user A based on the actions of users B, C, D, and E. Thus, user A may receive messages such as "Users B and C are attending event X," or "User C sent User D a gift," or "User D is now friends with User E."

The application identification module 270 includes data associated with one or more third-party application servers 120 and communicates with the user profile store 210 and communication module 205. For clarity, the application identification module 270 is described with reference to FIG. 3, which illustrates an example implementation of an application identification module 270. In an embodiment, the application identification module 270 includes one or more application profiles 300 associated with various third-party application servers 120 that communicate with the social network host site 130. The application profiles 300 shown in the example of FIG. 3 include an application identifier 310, an application address 320 and application data 330.

Figure 3:
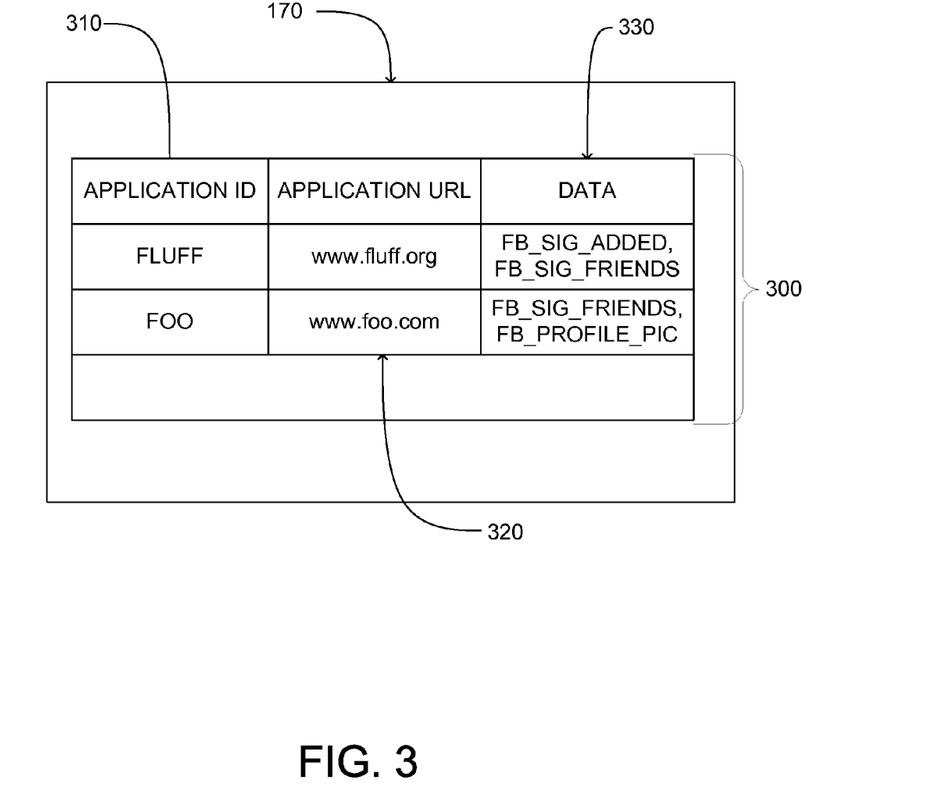
FIG. 3 is a block diagram illustrating an application identification module for determining a third-party application server associated with an application request received by a social networking website.

The social network host site 130 receives from a client device 110 a request to access a third-party application server 120 for a specific third-party application provided by that server 120; the request includes an application identifier 310 associated with the third-party application, such as an application name, identification code or the like. This allows the application identifier 310 to uniquely identify various applications provided by one or more third-party application servers 120. The received request is passed to application identification module 270, which uses the application identifier 310 to identify a third-party application server 120 associated with the received request by identifying an application address 320 associated with the received application identifier 320. The application address 320 included in an application profile 300 includes data identifying a Uniform Resource Indicator (URI), Internet Protocol (IP) address or other data describing how to access the third-party application server 120 providing the requested application.

The application profile 300 also associates application data 330 with the application identifier 310 and application address 320. The application data 330 identifies data stored by the social network host site 130 that is transmitted to third-party application server 120. For example, the application data 330 identifies one or more parameters of a stored user profile, such as geographic location, educational history, employment status, employment history, user interests, user hobbies and/or additional descriptive data that is to be accessed by the third-party application server 120 to construct the application content. In one embodiment, the application data 330 uses parameter names or identifiers specified by a programming language, such as "Facebook Markup Language" (FBML), or other programming language describing storage and/or display of data. In the example shown in FIG. 3, the application data 330 uses parameter identifiers "FB_SIG_ADDED" to request data indicating whether a user has previously accessed the third-party application server 120, "FB_SIG_FRIENDS" to request data describing a list of the user's friends from the social network host site 130 and "FB_PROFILE_PIC" to request an image associated with a user profile. The application data 330 shown in FIG. 3 are merely examples and in other embodiments any other parameter identifies or names can be specified. The application data 330 specifies data that is retrieved from the user profile associated with the user requesting access to the third-party application server 120 and is transmitted to the third-party application server 120 from the social network host site 130. In one configuration, the application identification module 270 uses a relational database to store the application profiles 300.

Figure 4:
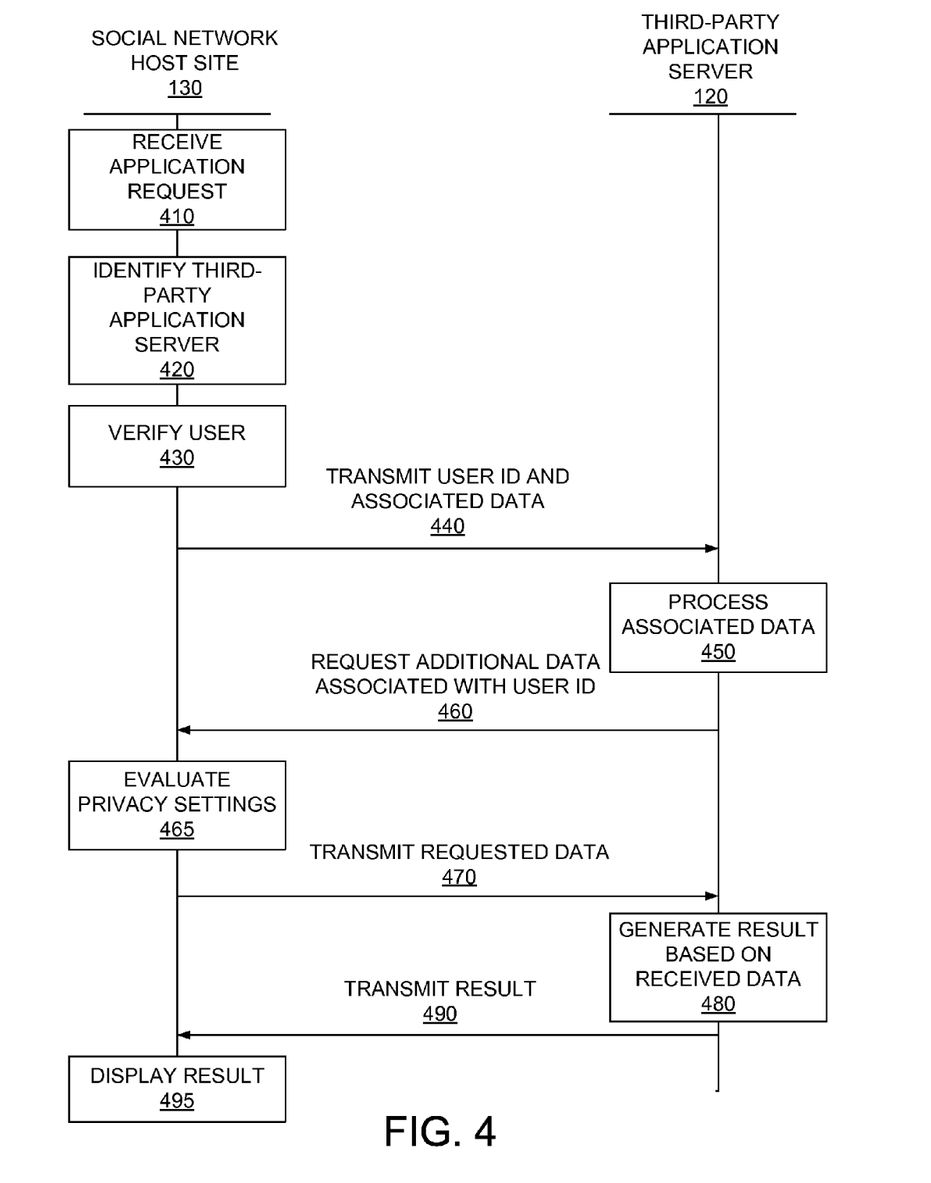
FIG. 4 is an event diagram illustrating sharing of user data between a third-party application server and a social networking website.

FIG. 4 shows an event diagram illustrating the process by which user data from a user's profile is accessed by a third-party application server 120 and used to personalize the application content. The actions described in FIG. 4 can be implemented by various computer systems executing instructions that cause the described actions. Those of skill in the art will recognize that one or more of the actions may be implemented in embodiments of hardware and/or software or combinations thereof. For example, instructions for performing the described actions are embodied or stored within a computer readable storage medium. Other embodiments can include different and/or additional steps than the ones described here.

Initially, a social network host site 130 receives 410 a request from a client device 110, to access an application provided by a third-party application server 120. For example, a client device 110 user provides a URI to access the social network host site 130 that identifies an application provided by the third-party application server 120, such as a URI having the form of "apps.facebook.com/fluff," which identifies the social network host site 130 ("apps.facebook.com") and identifies the requested application ("fluff"). Hence, the URI or other application request includes an application identifier that is used by the application identification module 270 of the social network host site 130 to identify 420 the third-party application server 120 associated with the requested application. For example, the application identifier 310 included in the URI, or other application request, used to access the social network host site 130 is processed to identify 420 an application profile including the application address 320 associated with the application identifier 310. For example, a hash function is applied to the received URI or other application request to identify the application profile including the application address 320 associated with the requested application. The application address 320 is a URI used to access the third-party application server 120 associated with the received application identifier 310. The application address is prepended to the application name to form a full URI for accessing the third party application at the third party server.

The social network host site 130 verifies 430 that the user providing the request is a member of the social network host website 430. In one embodiment, the social network host website 430 transmits a message to the client device 110 requesting that the user enter a login name and password or other user credentials associated with the social network host site 130. Alternatively, the application request initially received 410 by the social network host site 130 includes a login name and password or other user credentials associated with the user requesting 410 the application. The social network host site 130 then verifies 430 the user by authenticating the provided user credentials.

After verifying 430 that the requesting user is a member of the social network host site 130, the social network host site 130 transmits 440 the user identifier to the application address 320 associated with the third-party application server 120. In addition to providing the user identifier, the social network host site 130 also transmits 440 a session key to the third-party application server 120. The session key is uniquely associated with the particular user and session, and is used to identify data exchanges between the social network host site 130 and the third-party application server 120. Additionally, the session key specifies a length of time during which the social network host site 130 exchanges data with the third-party application server so that after the specified length of time lapses, data is not exchanged between third-party application server 120 and social network host site 130. Alternatively, the session key indicates that the social network host site 130 and third-party application server 120 exchange data for an indefinite interval, allowing data to be exchanged until terminated by the requesting user. Hence, the session key is generated by the social network host site 130 after verifying 430 that there is a social networking user profile associated with the requesting user and is used to uniquely identify data exchanges between the social network host site 130 and the third-party application server 120. In an embodiment, the social network host site 130 transmits 440 additional data to the third-party application server 120. For example, the social network host site 130 retrieves data specified by the application data 330 associated with the application identifier 310 from a user profile associated with the user requesting the application. This allows the social network host site 130 to provide data from the user profile of the requesting user to the third-party application server 120 to customize the data provided by the third-party application server 130.

After receiving the user identifier and any additional data from the social network host site 130, the third-party application server 120 processes 450 the received data to generate application content. The third-party application server 120 may request 460 additional data associated with the user identifier from the social network host site 130 during processing 450 of the received data. This enables the third-party application server 120 to obtain additional information about the requesting user from the social network host site 130, allowing the third-party application server 120 to further personalize the generated application content based on specific user data. For example, the third-party application server 120 requests 460 data describing other members the requesting user has recently added as friends or requests 460 describing actions recently taken by friends of the requesting user.

As indicated above, this application data 330 provided to the application server 130 can include any data from the user profile, as well as information from the user profiles of the user's friends. In one embodiment, the provided application data 300 is limited to that data which is available pursuant to the user's privacy setting, as well as in according to the privacy settings of the user's friends. In one embodiment, this is implemented as follows. First, the social network host site 130 obtains all of the user data, and data of the user's friends, as described above. The social network host site 130 then evaluates 465 one or more privacy settings of the user profile of the requesting user to determine whether the data requested by the third-party application server 120 is able to be accessed by third-parties. This allows the requesting user to regulate what data in the user profile is accessible by the third-party application by modifying the privacy settings. Hence, the third-party application server 120 is only able to access certain user-selected data from the user profile. Similarly, if the third-party application server 120 requests data from additional users, such as the requesting user's friends, the privacy settings of the additional users are examined. This prevents the third-party application server 120 from receiving information from the additional users that the additional users have not made publicly available. Thus, while the social network host site 130 allows the third-party application server 120 to access information associated with the requesting user from the social network host site 130, the accessible information is limited by user privacy settings, allowing different users to regulate the type and amount of information accessible by the third-party application server 120. In sum, the application content is both personalized to the current user, and constrained by the privacy settings of the user and the user's friends.

The social network host site 130 then transmits 470 the requested data, or a subset of the requested data, to the third-party application server 120. The third-party application server 120 then generates 480 the application content, such as an output message or other data based on the requested data and transmitted user identifier and other associated data. As can be appreciated, this application content is personalized to the user, as it is based at least on the user profile data, and optionally as well on the information from the user profiles of the user's friends. The generated result is then transmitted 490 from the third-party application server 120 to the social network host site 130 where the result is displayed 495.

Communicating user profile data between the social network host site 130 and the third-party application server 120, allows the third-party application server 120 to customize interaction with a user based on user data stored by the social network host site 130. This allows the third-party application server 120 to provide more relevant information or services to the social network site user, improving interaction between the social network site user and the third-party application server 120.

For example, assume a third-party application is configured to provide the functionality of displaying a user's favorite songs, along with retrieving data from the social network site host 120 allows the application to additionally display the favorite songs of one or more friends of the social network site user. As can be appreciated, this information will be tailored to each user individually, since each user has a unique combination of user data as well as friends. By personalizing the application content in this manner, the application is significantly more interesting and relevant to the user, as compared to a generic application that would merely display the most popular songs within the social network host site overall. This is because users are more interested in what their friends are interested in, that what others unknown to the user are interested in. Additionally, providing access to user profile data by the social network host site 130 to the third-party application server 120 simplifies user interaction with the third-party application server 120 by allowing the third-party application server 120 to initially display socially relevant information to the user rather than requiring the user to provide additional data to the third-party application server 120.

Figure 5:
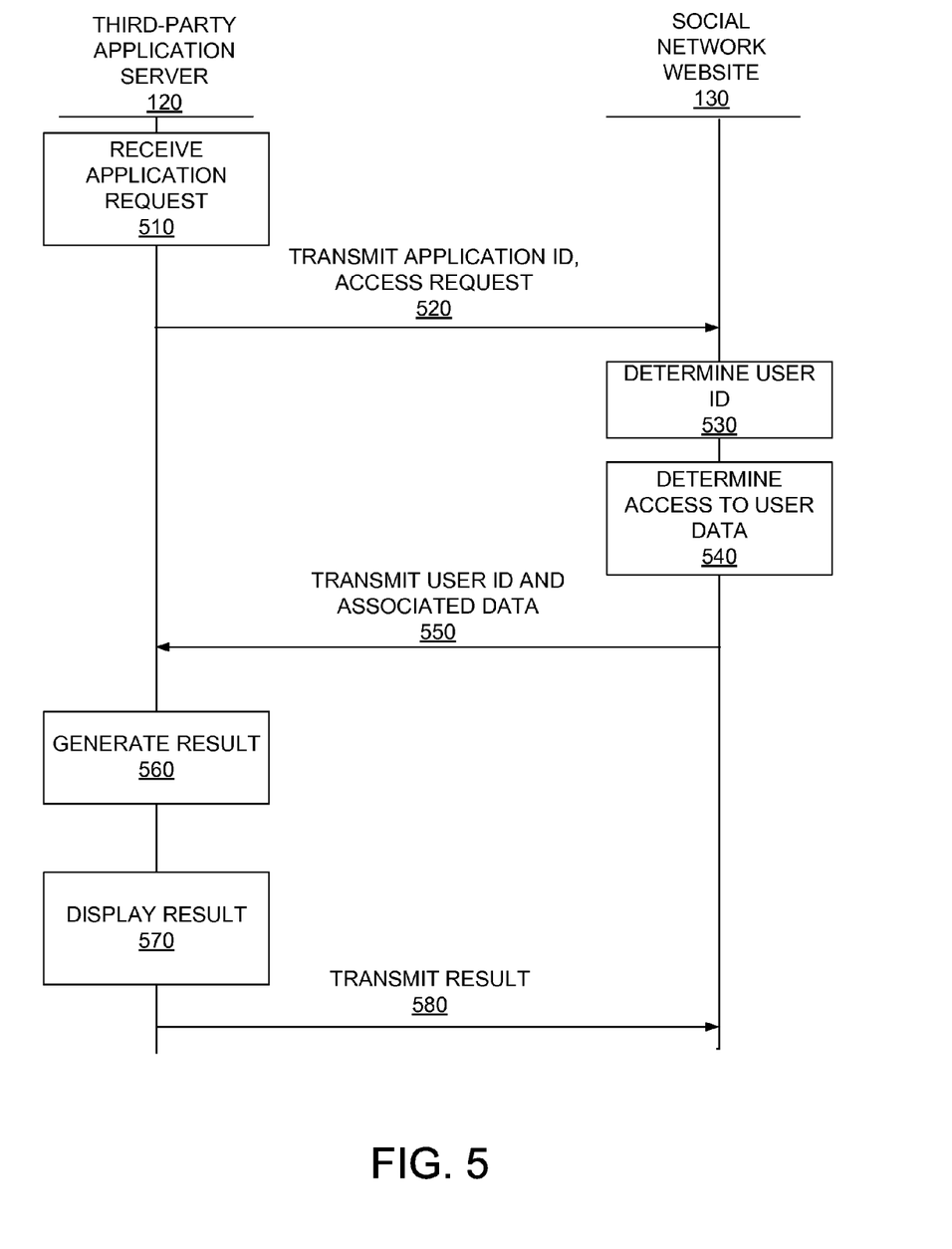
FIG. 5 is an event diagram illustrating an alternate method of sharing user data between a third-party application server and a social networking website.

FIG. 5 shows an event diagram illustrating an alternative method for providing access to user data from social networking host site 130 to user data to a third-party application server 120. The actions described in FIG. 5 can be implemented by a processor executing instructions that cause the described actions. Those of skill in the art will recognize that one or more of the actions may be implemented in embodiments of hardware and/or software or combinations thereof. For example, instructions for performing the described actions are embodied or stored within a computer readable storage medium. Other embodiments can include different and/or additional steps than the ones described here.

Initially, a third-party application server 120 receives 510 a request, from a client device 110, to access an application. For example, a client device 110 user provides a URI or other application request to access the third-party application server 120 which identifies an application provided by the third-party application server 120. For example, a client device 110 user provides a URI to access the third-party application server 120 that identifies an application provided by the third-party application server 120, such as a URI identifying the requested application. The third-party application server 120 then determines an application identifier 310 associated with the requested application. For example, the third-party application server 120 extracts the application identifier 310 from the URI or other application request. The third-party application server 120 then transmits 520 to the social network host site 130 the application identifier 310 associated with the requested application and an access request via network 110. The access request identifies a subset of user profile data stored by the social network host site 130 associated with the requesting user. Alternatively, the third-party application server 120 transmits 510 the application identifier 310 to the social network host site 130, which identifies identify application data 330 associated with the application identifier 310 by accessing an application identification module 270.

Upon receiving the application identifier 310 and access request, the social network host site 130 determines 530 a user identifier associated with the requesting user. In one embodiment, the social network host website 130 transmits a message to the client device 110 requesting that the user enter a login name and password or other user credentials associated with the social network host site 130 using a login or other access web page. Alternatively, the access request from the third-party application server 120 includes user credentials, such as a user name and password, specifying a social networking website member. The social network host site 130 then determines 530 the user by authenticating the provided user credentials.

The social network host website 130 also determines 540 whether the third-party application server 120 is permitted to access data included in the user profile. As indicated above in conjunction with FIG. 4, the data provided to the application server 130 from the social network host site 120 can include any data from the user profile, as well as information from the user profiles of the user's friends. In one embodiment, the data provided to the application server 120 is limited to that data which is available pursuant to the user's privacy setting, as well as in according to the privacy settings of the user's friends. In one embodiment, this is implemented as follows. First, the social network host site 130 obtains all of the user data, and data of the user's friends, as described above in conjunction with FIG. 4. The social network host site 130 then evaluates one or more privacy settings of the user profile of the requesting user to determine 540 whether the data requested by the third-party application server 120 is able to be accessed by third-parties. This allows the requesting user to regulate what data in the user profile is accessible by the third-party application 120 by modifying the privacy settings. Hence, the third-party application server 120 is only able to access certain user-selected data from the user profile. Similarly, if the third-party application server 120 requests data from additional users, such as the requesting user's friends, the privacy settings of the additional users are examined. This prevents the third-party application server 120 from receiving information from the additional users that the additional users have not made publicly available. Thus, while the social network host site 130 allows the third-party application server 120 to access information associated with the requesting user from the social network host site 130, the accessible information is limited by user privacy settings, allowing different users to regulate the type and amount of information accessible by the third-party application server 120. In sum, the application content is both personalized to the current user, and constrained by the privacy settings of the user and the user's friends.

If the social network host site 130 determines 540 that the third-party application server 120 is permitted to access user profile data of the requesting user, the social network host site 130 transmits 550 the user identifier to the third-party application server 120. In addition to providing the user identifier, the social network host site 130 also transmits 550 a session key to the third-party application server 120. The session key is uniquely associated with the particular user and session, and is used to identify subsequent data exchanges between the social network host site 130 and the third-party application server 120. The session key is further described above in conjunction with FIG. 4. The third-party application server 120 then generates 560 a result, such as an output message, using the data received from the social network host site 130.

In generating 560 the result, the third-party application server 120 may request additional data associated with the requesting user or other users associated with the requesting user from the social network host site 130. Such a request for additional data is described above in conjunction with FIG. 4. The generated result is then displayed 570 by the third-party application server 120. Alternatively, the result is transmitted 580 from the third-party application server to the social network site host 130, allowing the result to be displayed using an interface or display associated with the social network website. Hence, a user may request an application using a third-party application sever 120 or using a social network host site 130 and information maintained by the social network host site 130 and associated with the requesting user is accessed by the third-party application server 120. This allows the third-party application sever 120 to customize or personalize the information or service provided to the requesting user based on data from the social network host site 130.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Additionally, although the foregoing embodiments have been described in the context of a social network website, it will apparent to one of ordinary skill in the art that the invention may be used with any social network service, even if it is not provided through a website. Any system that provides social networking functionality can be used in accordance with the present invention even if it relies, for example, on e-mail, instant messaging or any other form of peer-to-peer communications, or any other technique for communicating between users. Systems used to provide social networking functionality include a distributed computing system, client-side code modules or plug-ins, a client-server architecture, a peer-to peer communication system or other systems. The invention is thus not limited to any particular type of communication system, network, protocol, format or application.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method comprising:
   transmitting, to a third-party application server, a request from a user of a social networking system to access an application on the third-party application server;
   receiving from the third-party application server a request for user profile data for generating personalized content for the user;
   providing to the third-party application server the requested user profile data from a user profile for the user maintained by the social networking system, subject to a privacy setting that indicates whether one or more items of data included in the user profile is shareable with the third-party application server; and receiving application content personalized for the user by the third-party application server based on the transmitted user profile data.

2. The method of claim 1, wherein providing the requested user profile data subject to the privacy setting further comprises:
comparing the request for user profile data for generating personalized content personalized to the privacy setting associated with the user profile; and
transmitting a subset of the user profile data to the third-party application server.

3. The method of claim 2, wherein transmitting the subset of the user profile data further comprises:
responsive to the privacy setting indicating first data is publicly accessible, transmitting the first data to the third-party application server; and
responsive to the privacy setting indicating second data is not publicly accessible, preventing transmission of the second data to the third-party application server.

4. The method of claim 1, further comprising:
receiving, at the social networking system, the request to access the application from the user;
identifying the third-party application server associated with the request from the user.

5. The method of claim 4, wherein identifying the third-party application server associated with the request further comprises:
extracting an application identifier from the request; and
determining a third-party application server address associated with the application identifier.

6. The method of claim 1, further comprising:
receiving from the user the privacy setting that indicates whether one or more items of data included in the user profile is shareable with the third-party application server.

7. The method of claim 6, wherein the privacy setting is received with the request from the user to access the application.

8. The method of claim 1, further comprising:
receiving from the user a modification of the privacy setting updating which of the one or more items of data included in the user profile is shareable with the third-party application server.

9. The method of claim 1, further comprising:
receiving from the third-party application server a request for additional data included in the user profile; and
providing to the third-party application server a subset of the additional data included in the user profile subject to the privacy setting.

10. The method of claim 9, wherein the subset of the additional data included in the user profile comprises data classified as publicly accessible by the privacy setting.

11. The method of claim 1, wherein the requested user profile data comprises an identity of one or more other users with whom the user has established a connection in the social networking system.

12. The method of claim 1, wherein the application executes within the social networking system.

13. A computer program product comprising a non-transitory computer readable storage medium having instructions encoded thereon that, when executed by a processor, cause the processor to:
transmit, to a third-party application server, a request from a user of a social networking system to access an application on the third-party application server;
receive from the third-party application server a request for user profile data for generating personalized content for the user;
provide to the third-party application server the requested user profile data from a user profile for the user maintained by the social networking system, subject to a privacy setting that indicates whether one or more items of data included in the user profile is shareable with the third-party application server; and
receive application content personalized for the user by the third-party application server based on the transmitted user profile data.

14. The computer program product of claim 13, further comprising instructions that cause the processor to:
receive from the user the privacy setting that indicates whether one or more items of data included in the user profile is shareable with the third-party application server.

15. The computer program product of claim 14, wherein the privacy setting is received with the request from the user to access the application.

16. The computer program product of claim 13, further comprising instructions that cause the processor to:
receive from the user a modification of the privacy setting updating which of the one or more items of data included in the user profile is shareable with the third-party application server.

17. A method comprising:
transmitting to a social networking system a request to access an application received from a user of the social networking system;
receiving at the third-party application server a user identifier included in a user profile associated with the user of the social networking system and the request to access the application;
transmitting to the social networking system a request for data included in the user profile; and
receiving the requested data included in the user profile at the third-party application server subject to a privacy setting associated with the user profile, wherein the privacy setting determines whether the requested data included in the user profile is shareable with the third-party application server.

18. The method of claim 17, further comprising:
transmitting to the social networking system a request for additional data included in the user profile; and
receiving a subset of the additional data included in the user profile from the social networking system.

19. The method of claim 18, wherein the subset of the additional data included in the user profile comprises data classified as publicly accessible by the privacy setting associated with the user profile.

20. The method of claim 17, further comprising:
providing to the social networking system application content personalized for the user based on the transmitted user profile data.

21. The method of claim 17, wherein the requested data included in the user profile comprises an identity of one or more other users with whom the user has established a connection in the social networking system.

22. The method of claim 1, wherein the application executes within the social networking system.

23. A computer program product comprising a non-transitory computer readable storage medium having instructions encoded thereon that, when executed by a processor, cause the processor to:

transmit to a social networking system a request to access an application received from a user of the social networking system;

receive at the third-party application server a user identifier included in a user profile associated with the user of the social networking system and the request to access the application;

transmit to the social networking system a request for data included in the user profile; and receive the requested data included in the user profile at the third-party application server subject to a privacy setting associated with the user profile, wherein the privacy setting determines whether the requested data included in the user profile is shareable with the third-party application server.

24. The computer program product of claim 23, further comprising instructions that cause the processor to:

provide to the social networking system application content personalized for the user based on the transmitted user profile data.

\* \* \* \* \*